US009267848B2

(12) United States Patent
Al-Faifi

(10) Patent No.: US 9,267,848 B2
(45) Date of Patent: Feb. 23, 2016

(54) THERMOMETER USING DIFFERENTIAL TEMPERATURE MEASUREMENTS

(71) Applicants: KING ABDULLAH INTERNATIONAL MEDICAL RESEARCH CENTER, Riyadh (SA); KING SAUD BIN ABDULAZIZ UNIVERSITY FOR HEALTH SCIENCES, Riyadh (SA); NATIONAL GUARD HEALTH AFFAIRS, Riyadh (SA)

(72) Inventor: Abdulrahman Musa Al-Faifi, Riyadh (SA)

(73) Assignees: KING ABDULLAH INTERNATIONAL MEDICAL RESEARCH CENTER, Riyadh (SA); KING SAUD BIN ABDULAZIZ UNIVERSITY FOR HEALTH SCIENCES, Riyadh (SA); NATIONAL GUARD HEALTH AFFAIRS, Riyadh (SA)

(*) Notice: Subject to any disclaimer, the term of this patent is extended or adjusted under 35 U.S.C. 154(b) by 315 days.

(21) Appl. No.: 14/146,453

(22) Filed: Jan. 2, 2014

(65) Prior Publication Data

US 2015/0185086 A1    Jul. 2, 2015

(51) Int. Cl.
*G01N 25/00* (2006.01)
*G01K 3/14* (2006.01)
(Continued)

(52) U.S. Cl.
CPC .. *G01K 3/14* (2013.01); *G01K 1/02* (2013.01); *G01K 7/22* (2013.01); *G01K 7/42* (2013.01); *G01K 13/002* (2013.01)

(58) Field of Classification Search
CPC ......... G01K 3/13; G01K 13/002; G01K 7/42; G01K 14/14; G01K 1/02; G01K 7/021; G01K 1/00; G01N 25/4866; G01J 5/02

USPC ............. 374/11, 10, 110, 112, 137, 183, 185, 374/207, 170, 166, 102, 164, 163, 121, 208, 374/173; 702/130
See application file for complete search history.

(56) References Cited

U.S. PATENT DOCUMENTS

| 3,530,718 | A | * | 9/1970 | Ehlo | ........................ | G01K 7/24 338/28 |
| 4,183,248 | A | * | 1/1980 | West | ........................ | G01K 1/18 338/23 |

(Continued)

FOREIGN PATENT DOCUMENTS

JP      60-143731       7/1985

OTHER PUBLICATIONS

"Dual thermistors adult esophageal/rectal temperature probe, YSI 700 series, 10 feet", Alibaba website, www.alibaba.com/product-gs/489477514/Dual_thermistors_adult_esophageal_rectal, retrieved on Apr. 22, 3013, 3 pages.

*Primary Examiner* — Lisa Caputo
*Assistant Examiner* — Nigel Plumb
(74) *Attorney, Agent, or Firm* — Richard C. Litman

(57) ABSTRACT

The thermometer using differential temperature measurements utilizes a pair of adjacent temperature sensors in order to measure the temperature of a common surface over a pre-selected period of time. The thermometer includes a housing and first and second thermistors mounted adjacent one another on the housing. The first and second thermistors are positioned against the surface, which can be a body part (for oral, rectal or axial body temperature measurements) or can be any other desired surface for which a spot check temperature reading is desired. A programmable current source preheats the second thermistor to a pre-selected temperature, while the first thermistor is initially at room temperature. A controller inside the housing causes both the first and second thermistors to take instantaneous temperature measurements of the surface at two successive times. The controller linearizes the measurements to predict the temperature of the surface, which is then displayed to the user.

20 Claims, 3 Drawing Sheets

(51) Int. Cl.
  *G01K 1/02*  (2006.01)
  *G01K 7/22*  (2006.01)
  *G01K 7/42*  (2006.01)
  *G01K 13/00* (2006.01)

(56) References Cited

U.S. PATENT DOCUMENTS

| | | | | |
|---|---|---|---|---|
| 4,536,851 A | * | 8/1985 | Germanton | G01K 1/028 374/102 |
| 6,854,882 B2 | * | 2/2005 | Chen | G01K 13/002 374/163 |
| 7,059,767 B2 | * | 6/2006 | Tokita | G01K 7/42 374/135 |
| 2002/0026227 A1 | * | 2/2002 | Philips | A61F 7/12 607/113 |
| 2008/0049812 A1 | * | 2/2008 | Yu | G01K 7/42 374/163 |
| 2008/0294065 A1 | * | 11/2008 | Waldhoff | A61B 5/01 600/549 |
| 2011/0158284 A1 | * | 6/2011 | Goto | A61B 5/0008 374/163 |

* cited by examiner

THERMOMETER USING DIFFERENTIAL TEMPERATURE MEASUREMENTS

BACKGROUND OF THE INVENTION

1. Field Of The Invention

The present invention relates to thermometry, and particularly to a thermometer using differential temperature measurements from a pair of adjacent temperature sensors.

2. Description Of The Related Art

In a conventional electronic or digital thermometer, a single temperature probe, often a thermistor, is utilized. In such a conventional thermistor probe, parallel resistors are used in the thermistor circuit to improve the linearity over the desired temperature range. Although this approach improves linearity, allowing for relatively quick temperature measurements, the sensitivity of the thermometer is dramatically compromised, leading to an inability of the circuitry to measure small temperature variations. However, for both medical purposes and also when dealing with certain chemical reactions, for example, quick temperature readings with a high degree of accuracy and sensitivity may be necessary.

Thus, a thermometer using differential temperature measurements addressing the aforementioned problems is desired.

SUMMARY OF THE INVENTION

The thermometer using differential temperature measurements utilizes a pair of adjacent temperature sensors, initially at different temperatures, in order to measure the temperature of a common surface over a pre-selected period of time. The thermometer includes a housing and first and second thermistors mounted adjacent one another on the housing. The first and second thermistors are adapted for positioning against the surface, which can be a body part (for oral, rectal or axial body temperature measurements) or can be any other desired surface for which a spot check temperature reading is desired. A programmable current source, positioned inside the housing, is provided for pre-heating the second thermistor to a pre-selected temperature, while the first thermistor is initially at room or ambient temperature.

A controller is also positioned inside the housing. The controller first measures a temperature $b_C$ with the first thermistor at a first time $t_0$ and a temperature $b_H$ with the second thermistor, also at the first time $t_0$. After a pre-selected time period, the controller then measures a temperature $b_{C1}$ with the first thermistor at a second time $t_1$, and a temperature $b_{H1}$ with the second thermistor, also at the second time $t_1$. Over a relatively short time duration between measurements, the temperature curves are approximately linear, thus the controller can be used to calculate a slope $a_C$ of the linearized temperature measurement curve associated with the first thermistor as $$a_C = \frac{b_C - b_{C1}}{t_0 - t_1}$$

and a slope $a_H$ of the linearized temperature measurement curve associated with the second thermistor as $$a_H = \frac{b_H - b_{H1}}{t_0 - t_1}.$$

These slopes can then be used to calculate a temperature BT of the surface as $$BT = a_C \cdot \left(\frac{b_H - b_C}{a_C + a_H}\right) + b_C.$$

This measured temperature can then be displayed to the user on a suitable display in communication with the controller, such as a liquid crystal display or the like.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
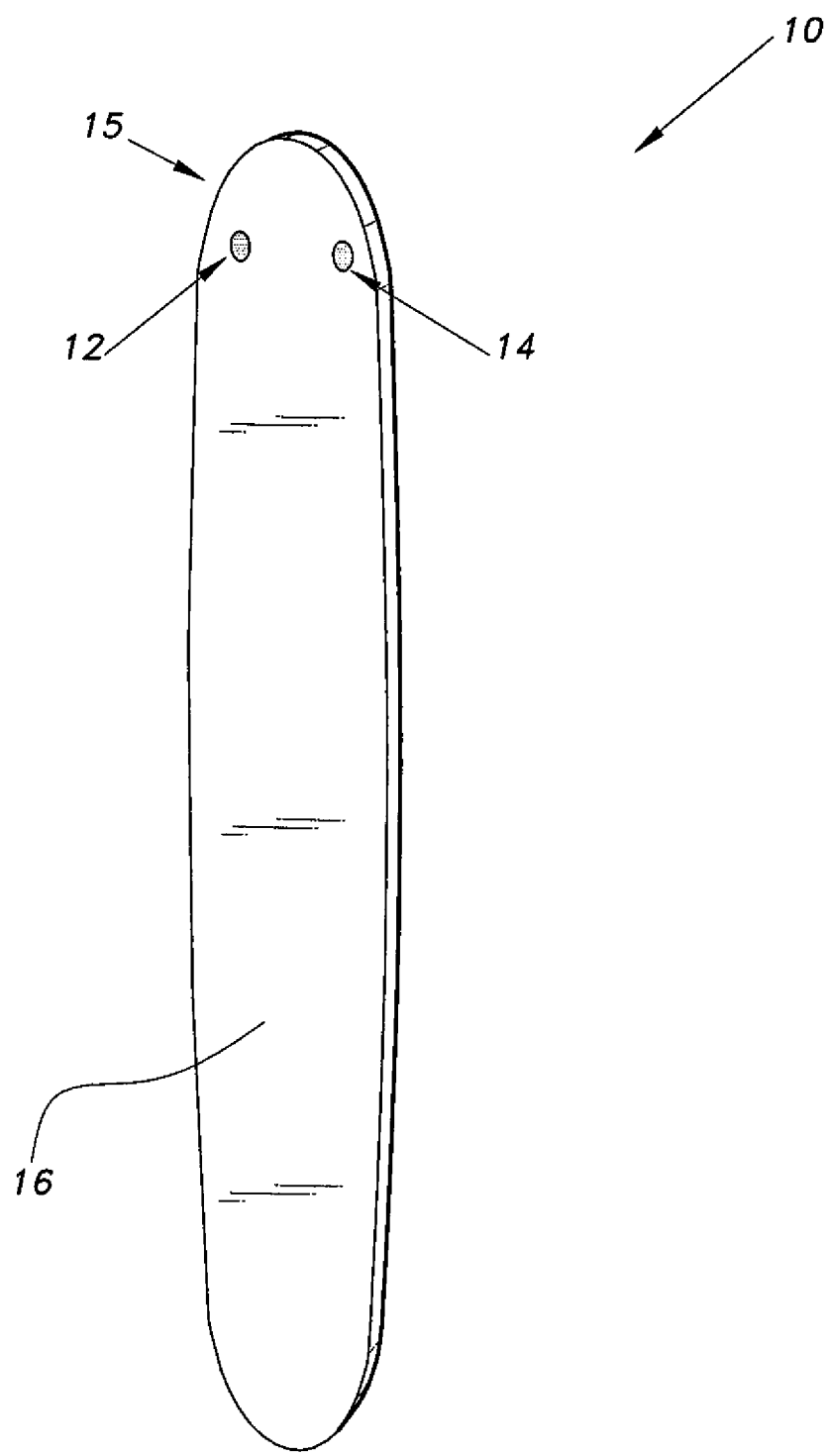
FIG. 1 is a perspective view of a thermometer using differential temperature measurements according to the present invention.

Referring now to FIG. 1, there is shown a thermometer 10 using differential temperature measurements which, as will be described in greater detail below, makes use of a pair of temperature sensors, such as thermistors 12, 14. Housing 16 can be formed from any suitable material having a relatively high thermal conductivity, such as stainless steel or the like. As shown in FIG. 1, housing 16 can have an overall contouring similar to that of a conventional tongue depressor, though desirably thinner, allowing the thermometer 10 to be comfortably used in a patient's mouth, rectum or armpit. Exemplary dimensions for the exemplary housing 16 of FIG. 1 are a length of approximately 7 cm, a width of approximately 5 mm, and a thickness of approximately 2 mm. It should be understood that the overall contouring and relative dimensions of housing 16 can be varied, dependent upon the particular intended function of thermometer 10. Although the interior of housing 16 can be filled with thermally conductive materials, at a sensor end or sensor area 15 of the housing 16 the temperature sensors, such as the thermistors 12, 14, are positioned in an adjacent, spaced apart relation to each other and the space or gap between the temperature sensors, such as the thermistors 12, 14, is desirably empty or filled with a thermally insulating material to prevent or substantially prevent heat transfer between the temperature sensors, such as between the thermistors 12, 14.

Figure 2:
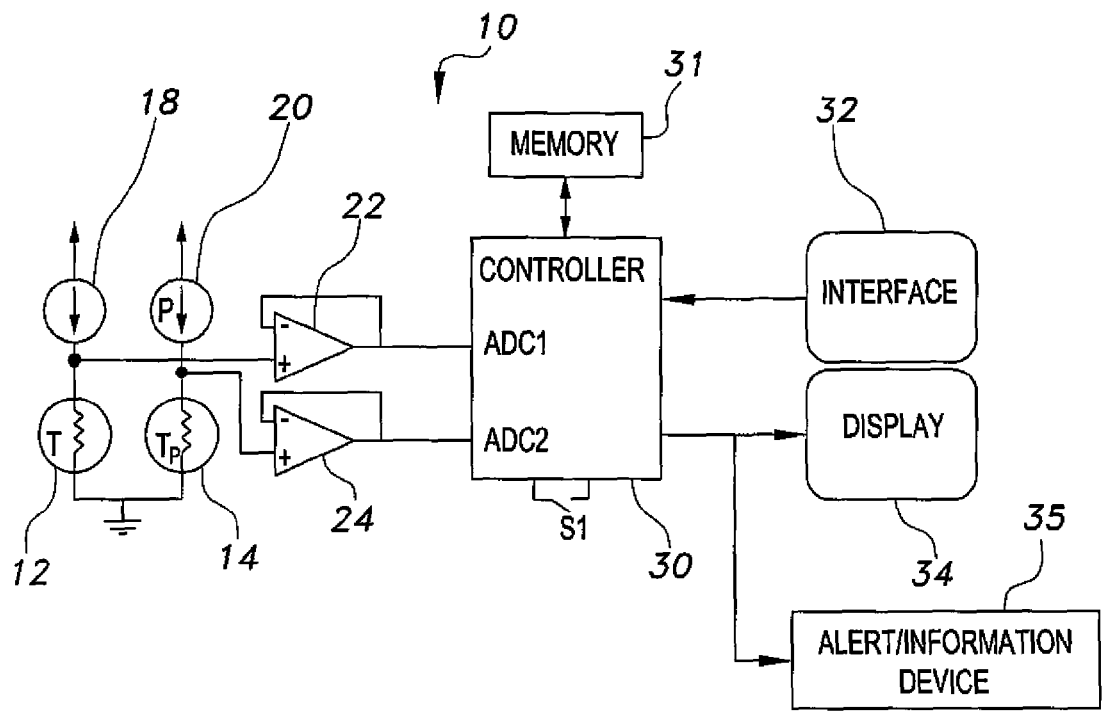
FIG. 2 is a schematic diagram showing circuitry of the thermometer using differential temperature measurements according to the present invention.

Each thermistor 12, 14 is desirably of the negative temperature coefficient (NTC) type, although a positive temperature coefficient (PTC) type thermistor can be also used for the thermistors with some modification, for example, in the thermometer 10. As shown in FIG. 2, the thermistor 12 is energized by a power source, such as a constant current source 18, whereas thermistor 14 is energized by a power source, such as a programmable current source 20, so as to pre-heat thermistor 14 to a temperature $T_p$. As shown, each of thermistors 12, 14 is buffered by a respective one of amplifiers 22, 24 before feeding measurement signals, via analog-to-digital channels ADC1 and ADC2, respectively, of a controller 30. The controller 30 is in communication with the components described herein, of the thermometer 10 to control, send or receive information or data in relation to temperature measurement by the thermometer 10. Also, a power source, such as can include a battery, as can be in conjunction with the constant current source 18 and the programmable current source 20, is typically provided to power operation of the thermometer 10 for temperature measurement, for example.

Controller 30 can be or be included in any suitable type of computer implemented device, such as a microprocessor, programmable controller, programmable logic controller (PLC), microcontroller, system on chip (SOC) processor, application specific integrated circuit (ASIC), or the like, for example. Calculations and implementation of temperature measurement, such as implementing a program or programs to carry out the steps or methods for temperature measurement by the thermometer 10, are performed or controlled by the controller 30. A program or programs or instructions to carry out the steps or methods for measuring temperature using the thermometer 10 can be stored in a memory 31, which can be any suitable type of computer readable and programmable memory. Memory 31 is desirably a non-transitory, computer readable storage medium, such as a semiconductor memory (for example, RAM, ROM, etc.), and the memory 31 can be separate from or integrated with the controller 30. Data or instructions can be entered into the thermometer 10 via a suitable type of interface 32, and such data or instructions can be stored in the memory 31.

Switch S1 of controller 30 can be any suitable type of manual switch, microswitch or the like, which desirably actuates the thermometer 10 when the thermometer 10 is removed from a handset, casing or the like. Upon actuation of switch S1, controller 30 causes the programmable current source 20 to deliver a current of approximately 50 mA to pre-heat thermistor 14 for a relatively short period of time (on the order of 500 ms). This current is used to raise the temperature $T_p$ of thermistor 14 to a pre-heated, pre-selected temperature up to approximately 42° C. The warming process is monitored by continuous measurement of the voltage drop on pre-heated thermistor 14 (i.e., a function of the resistance of thermistor 14 which is, in turn, a function of the temperature $T_p$).

In use, the approximately 500 ms warming period is desirably completed before introducing the thermometer 10 into the patient's mouth, rectum or armpit. As shown in FIG. 2, a display 34 is desirably in communication with controller 30. Display 34 can be any suitable type of display, such as a liquid crystal display (LCD) or the like, and can provide the user with a visual indication of when the thermometer 10 is ready for use or can provide a readout of the measured temperature. In addition to a visual display, such as the display 34, any suitable type of audio output, tactile output or data output can also be provided, such as to an alert/information device 35, such as can include a speaker, a buzzer, vibration member or other type of peripheral device, for example. Additionally, any suitable type of interface 32 can be provided, allowing the user to program the controller 30, such as control buttons, a keypad, a touchscreen or the like. It should be understood that display 34 can be used to provide the user with any desired information, such as readiness, battery level, etc. and, similarly, interface 32 can be used to program controller 30 with any desired data or instructions.

Figure 3:
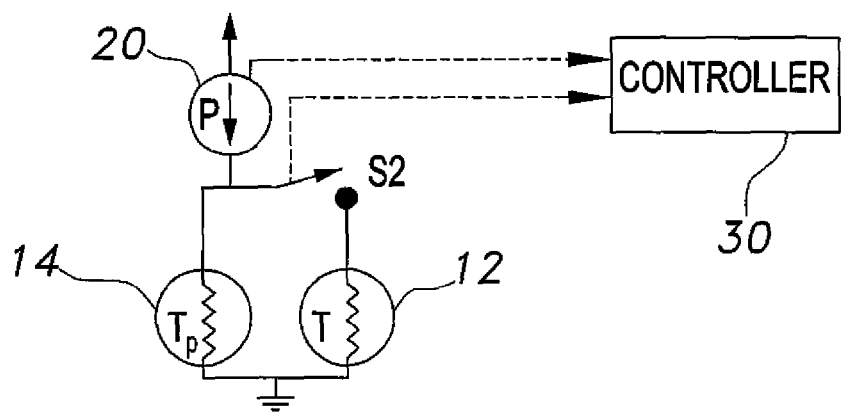
FIG. 3 is a schematic diagram illustrating an alternative biasing circuit for the thermometer using differential temperature measurements.

Once the warming of pre-heated thermistor 14 to a temperature of $T_p$ has been completed, the controller 30 controls both current sources 18, 20 deliver an excitation current of approximately 500 µA to thermistors 12, 14, respectively. In order to eliminate possible variation between current sources 18, 20, the alternative circuit of FIG. 3 can be utilized to bias both thermistors 12, 14 with only programmable current source 20. In use, the switch S2 is normally in the "off" or open state. As in the previous embodiment, the controller 30 sets the output of programmable current source 20 to approximately 500 µA for a pre-set period of time. Once the pre-set temperature of thermistor 14 is reached, the switch S2 is closed (or set to the "on" position) by the controller 30, biasing both thermistors 12, 14 with only current source 20, which is producing a current of approximately 500 µA for both thermistors.

In order to detect the placement of the thermometer 10 in the patient's mouth, for example, the controller 30 monitors the temperature of each thermistor 12, 14 to detect a sudden decrease in temperature Tp of pre-heated thermistor 14 and a sudden increase in temperature T of non-heated thermistor 12. As an alternative, a capacitance sensor can be used to detect the contact of the housing 16 with the human body. Such an arrangement can be implemented by utilizing the metal housing 16 and/or a thermometer cover. Any suitable type of capacitance sensor can be utilized.

Immediately following the detection stage, the temperature is measured by each thermistor 12, 14. The temperature T measured by non-heated thermistor 12 should be greater than or equal to approximately 32° C. and the temperature $T_p$ measured by pre-heated thermistor 14 should be less than or equal to approximately 42° C., otherwise the controller 30 will trigger an alert signal, such as to provide an alert by one or more of the display 34 or the alert/information device 35, indicating that the patient whose temperature is being measured by the thermometer 10 is likely suffering from hypothermia or hyperthermia, dependent upon the temperature reading.

Figure 4:
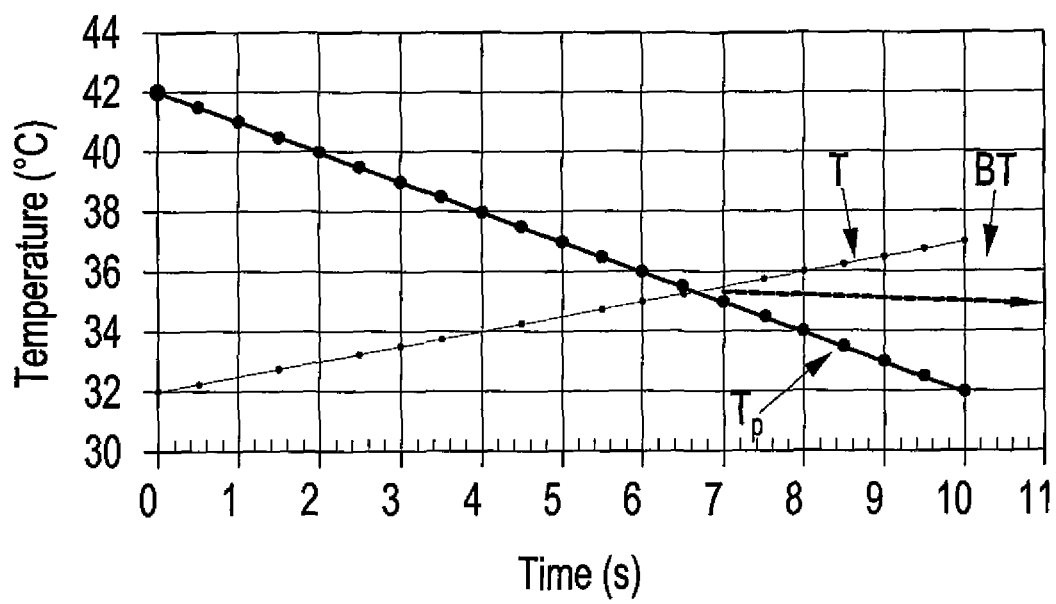
FIG. 4 is a graph showing temperature measurements as a function of time for a heated thermistor and an unheated thermistor of the thermometer using differential temperature measurements according to the present invention.

If the measured temperatures are within the expected ranges, the temperature measurements, as a function of time, should follow the curves shown in FIG. 4. The decreasing line in FIG. 4 (i.e., temperature linearly decreasing as a function of time) indicates the temperature $T_p$ measured by pre-heated thermistor 14, and the increasing line in FIG. 4 (i.e., temperature linearly increasing as a function of time) indicates the temperature T measured by non-heated thermistor 12. Given the relatively small temperature range and expected linear behavior of the temperature increases and decreases, a straight line equation can be used to predict the patient's body temperature or a temperature of a surface (BT). It should be understood that thermistors 12, 14 do not take direct temperature measurements. As is well known, thermistors have a varying resistance which is dependent upon temperature. It is this variation in resistance which is being measured (in terms of the corresponding variation in current and/or voltage) and the controller 30 (via channels ADC1 and ADC2) converts the received signals into corresponding temperature measurements. As opposed to a conventional single-thermistor temperature probe, no linearization is typically required at this point, as the voltage drop across the thermistors can be used against a lookup table, for example, (desirably stored in the memory 31 associated with the controller 30) to calculate the temperature in a very small segment of the thermistor resistance curve, which is typically very linear.

The initial temperature T of non-heated thermistor 12 is expected to be room or ambient temperature. For the linear curves of FIG. 4, after approximately 250 ms, for example, the initial temperature reading for non-heated thermistor 12 is given as $b_C$ and the initial temperature reading for pre-heated thermistor 14 is given as $b_H$ (both taken at a time denoted $t_0$). Using this convention, after another 250 ms, for example, the temperature readings are respectively given by $b_{C1}$ and $b_{H1}$ (measured at a time denoted as $t_1$). Given the linear nature of the curves in FIG. 4, only these readings typically are needed to predict the overall straight line curves. The predicted temperature $T_C$ for non-heated thermistor 12 and the predicted temperature $T_H$ for pre-heated thermistor 14 can be described by the following linear equations:

$$T_C = a_C t + b_C;\text{ and} \quad (1)$$

$$T_H = -a_H t + b_H, \quad (2)$$

where t represents time and $a_C$ and $a_H$ are the slopes of the T and $T_p$ curves of FIG. 4, respectively; i.e., $$a_C = \frac{b_C - b_{C1}}{t_0 - t_1} \text{ and } a_H = \frac{b_H - b_{H1}}{t_0 - t_1}.$$

After a certain point of time, both thermistors 12, 14 will ultimately read the same temperature (i.e., the point in FIG. 4 where curves T and $T_p$ cross). From equations (1) and (2), this time $t_{BP}$ is given as:

$$t_{BP} = \frac{b_H - b_C}{a_C + a_H}, \quad (3)$$

and the temperature at time $t_{BP}$ (i.e., the body temperature or surface temperature BT) is given by:

$$BT = a_C \cdot \left(\frac{b_H - b_C}{a_C + a_H}\right) + b_C. \quad (4)$$

The above calculations are performed by controller 30. The controller 30 in conjunction with the thermistors 12, 14 can therefore provide a means for measuring and calculating a temperature BT of a body or a surface, for example. Controller 30 desirably also includes timing circuitry for performing the successive measurements over the pre-set time duration, although it should be understood that a separate timer can be in communication with controller 30. The thermometer 10 uses one non-heated thermistor 12 and one pre-heated thermistor 14 to guarantee that the two temperature outputs from the thermistors 12, 14 must level off or cross at a specific time with a specific temperature reading BT, as indicated by the dashed line in FIG. 4. Once each of thermistors 12, 14 generate the same temperature reading, the body or surface temperature BT has been found, and any further output should be in the form of the flat, single curve BT. It should be understood that, alternatively, rather than using pre-heating, the slopes $a_c$ and $a_H$ could be found by controlling the heat transfer, controlling the sensitivity, or by any other suitable technique that would result into different slopes. As a further alternative, this could also be accomplished by choosing one of the thermistors to have a positive temperature coefficient while the other would be selected with a negative temperature coefficient.

Figure 5:
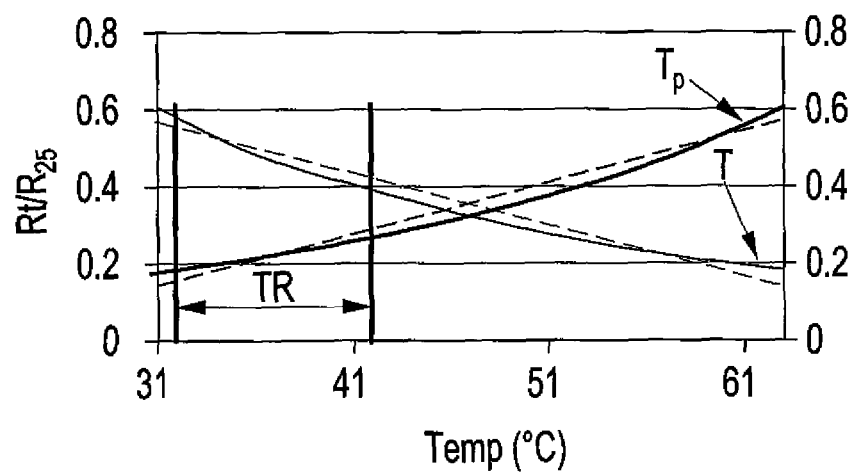
FIG. 5 is a graph showing response as a function of temperature for the heated thermistor and the unheated thermistor of the thermometer using differential temperature measurements.

The accuracy of the dual-thermistor technique described above is relatively higher than that of a conventional single temperature sensor due to the fact that the pair of thermistors 12, 14 allow for a very small part of the curve to be used for evaluating the temperature measurement. In general, the smaller the temperature range measured, the greater the linearity of the curve which, consequently, increases the accuracy in prediction. FIG. 5 illustrates measurement within a relatively small temperature range TR. The vertical axis in FIG. 5 measures the typical resistance variation (Rt) relative to thermistor resistance at 25° C. ($R_{25}$). Over the entire range between 31° C. and 63° C., both the T and $T_p$ curves show non-linear behavior. However, in the limited range TR, each curve is approximately linear. The linearized approximations are shown by the dashed lines in FIG. 5. The accuracy (in terms of error percentage) for non-heated thermistor 12 is given by $$E_T = \frac{(\text{Actual Value of }T) - (\text{Linearized Approximation of }T)}{\text{Actual Value of }T} \times 100$$

and the accuracy for pre-heated thermistor 14 is given by $$E_{T_p} = \frac{(\text{Actual Value of }T_p) - (\text{Linearized Approximation of }T_p)}{\text{Actual Value of }T_p} \times 100.$$

The accumulated error (E) of both sensors is given by $E = \sqrt{E_T^2 + E_{T_p}^2}$. When the linearity of the small temperature range is taken into account, the error percentage approaches zero. Additionally, due to the linearity over this small range, only a single point is required for calibration of the thermometer 10.

It should be understood that thermometer 10 can be used in the place of a conventional handheld thermometer, as a part of a larger vital sign monitoring system, or as part of any other medical device where an oral/rectal/axillary temperature spot check can be needed. In addition to medical uses, it should be understood that thermometer 10 can be used for any application where high performance and sensitivity over a relatively small temperature range are needed.

It is to be understood that the present invention is not limited to the embodiments described above, but encompasses any and all embodiments within the scope of the following claims.

I claim:

1. A thermometer using differential temperature measurements, comprising:
   a housing having a sensor area;
   first and second thermistors mounted in adjacent spaced relation in the sensor area on the housing, said first and second thermistors being adapted for positioning against a surface;
   a programmable current source for pre-heating said second thermistor to a pre-selected temperature, wherein said first thermistor is initially at a room temperature;
   means for measuring a temperature $b_C$ with said first thermistor at a first time $t_0$;
   means for measuring a temperature $b_H$ with said second thermistor at the first time $t_0$;

means for measuring a temperature $b_{C1}$ with said first thermistor at a second time $t_1$;
means for measuring a temperature $b_{H1}$ with said second thermistor at the second time $t_1$;
means for calculating a slope $a_C$ of a linearized temperature measurement curve associated with said first thermistor as $$a_C = \frac{b_C - b_{C1}}{t_0 - t_1};$$

means for calculating a slope $a_H$ of a linearized temperature measurement curve associated with said second thermistor as $$a_H = \frac{b_H - b_{H1}}{t_0 - t_1};$$

means for calculating a temperature BT of the surface as $$BT = a_C \cdot \left(\frac{b_H - b_C}{a_C + a_H}\right) + b_C;$$

and
a display for displaying the temperature BT.

2. The thermometer using differential temperature measurements as recited in claim 1, wherein each of said first and second thermistors has a negative temperature coefficient.

3. The thermometer using differential temperature measurements as recited in claim 1, wherein said programmable current source delivers a current of approximately 50 mA to said second thermistor to pre-heat said second thermistor.

4. The thermometer using differential temperature measurements as recited in claim 1, wherein the second time $t_1$ is approximately 250 ms greater than the first time $t_0$.

5. The thermometer using differential temperature measurements as recited in claim 1, further comprising:
a constant current source to energize said first thermistor after pre-heating said second thermistor to the pre-selected temperature.

6. The thermometer using differential temperature measurements as recited in claim 1, wherein said programmable current source energizes said first thermistor and said second thermistor after pre-heating said second thermistor to the pre-selected temperature.

7. A thermometer using differential temperature measurements, comprising:
a housing having a sensor area;
first and second temperature sensors mounted in adjacent spaced relation in the sensor area on said housing, said first and second temperature sensors being adapted for positioning against a surface;
a power source for pre-heating said second temperature sensor to a pre-selected temperature, wherein said first temperature sensor is initially at an ambient temperature; and
a computer implemented device, the computer device including a processor and a program stored in a memory, the computer implemented device in communicative relation with and controlling operation of said first and second temperature sensors and said power source, the program directing the computer implemented device to perform the following including:
measuring a temperature $b_C$ with said first temperature sensor at a first time $t_0$;
measuring a temperature $b_H$ with said second temperature sensor at the first time $t_0$;
measuring a temperature $b_{C1}$ with said first temperature sensor at a second time $t_1$;
measuring a temperature $b_{H1}$ with said second temperature sensor at the second time $t_1$;
calculating a slope $a_C$ of a linearized temperature measurement curve associated with said first temperature sensor as $$a_C = \frac{b_C - b_{C1}}{t_0 - t_1};$$

calculating a slope $a_H$ of a linearized temperature measurement curve associated with said second temperature sensor as $$a_H = \frac{b_H - b_{H1}}{t_0 - t_1};$$

and
calculating a temperature BT of the surface as $$BT = a_C \cdot \left(\frac{b_H - b_C}{a_C + a_H}\right) + b_C.$$

8. The thermometer using differential temperature measurements as recited in claim 7, further comprising:
a display for displaying the temperature BT.

9. The thermometer using differential temperature measurements as recited in claim 7, wherein said first and second temperature sensors respectively comprise a first thermistor and a second thermistor.

10. The thermometer using differential temperature measurements as recited in claim 9, wherein said power source comprises:
a programmable current source for pre-heating said second thermistor to the pre-selected temperature, and
a constant current source to energize said first thermistor after said second thermistor is pre-heated to the pre-selected temperature.

11. The thermometer using differential temperature measurements as recited in claim 10, wherein said programmable current source delivers a current of approximately 50 mA to said second thermistor to pre-heat said second thermistor.

12. The thermometer using differential temperature measurements as recited in claim 11, wherein the second time $t_1$ is approximately 250 ms greater than the first time $t_0$.

13. The thermometer using differential temperature measurements as recited in claim 10, further comprising:
a display for displaying the temperature BT.

14. The thermometer using differential temperature measurements as recited in claim 7, wherein
said first and second temperature sensors respectively comprise a first thermistor and a second thermistor each having a negative temperature coefficient, and
said power source comprises at least one current source.

15. A method for measuring temperature, comprising the steps of:
- positioning first and second thermistors against a surface, wherein said first thermistor is initially at room temperature and said second thermistor is pre-heated to a pre-selected temperature;
- measuring a temperature $b_C$ with said first thermistor at a first time $t_0$;
- measuring a temperature $b_H$ with said second thermistor at the first time $t_0$;
- measuring a temperature $b_{C1}$ with said first thermistor at a second time $t_1$;
- measuring a temperature $b_{H1}$ with said second thermistor at the second time $t_1$;
- calculating a slope $a_C$ of a linearized temperature measurement curve associated with said first thermistor as $$a_C = \frac{b_C - b_{C1}}{t_0 - t_1};$$

- calculating a slope $a_H$ of a linearized temperature measurement curve associated with said second thermistor as $$a_H = \frac{b_H - b_{H1}}{t_0 - t_1};$$

- calculating a temperature BT of the surface as $$BT = a_C \cdot \left(\frac{b_H - b_C}{a_C + a_H}\right) + b_C;$$

and
- displaying the temperature BT.

16. The method for measuring temperature as recited in claim 15, further comprising the step of:
- selectively delivering current to said second thermistor to pre-heat said second thermistor to the pre-selected temperature.

17. The method for measuring temperature as recited in claim 16, wherein the step of selectively delivering the current to said second thermistor comprises delivering a current of approximately 50 mA to said second thermistor.

18. The method for measuring temperature as recited in claim 16, further comprising the step of: monitoring a temperature of said second thermistor during the pre-heating thereof.

19. The method for measuring temperature as recited in claim 15, wherein the second time $t_1$ is approximately 250 ms greater than the first time $t_0$.

20. The method for measuring temperature as recited in claim 15, further comprising the step of:
- generating an alarm signal when the temperature BT falls outside of a predetermined temperature range.

* * * * *